United States Patent
Chien et al.

(10) Patent No.: US 7,426,293 B2
(45) Date of Patent: Sep. 16, 2008

(54) RAPID COLOR RECOGNITION METHOD

(75) Inventors: Chien-Chia Chien, Nantou County (TW); Chia-Pao Cheng, Hsinchu (TW); Li-Ming Chen, Keelung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 750 days.

(21) Appl. No.: 10/710,767

(22) Filed: Aug. 2, 2004

(65) Prior Publication Data

US 2005/0226497 A1 Oct. 13, 2005

(30) Foreign Application Priority Data

Apr. 6, 2004 (TW) ............... 93109448 A

(51) Int. Cl.
*G06K 9/00* (2006.01)
(52) U.S. Cl. .................................. 382/162
(58) Field of Classification Search ......... 382/162–167; 345/589–610; 358/515–540
See application file for complete search history.

(56) References Cited

U.S. PATENT DOCUMENTS

| | | | |
|---|---|---|---|
| 5,504,821 A * | 4/1996 | Kanamori et al. | 382/167 |
| 5,704,026 A * | 12/1997 | Wan | 345/590 |
| 6,480,624 B1 * | 11/2002 | Horie et al. | 382/165 |
| 6,782,127 B1 * | 8/2004 | Lee et al. | 382/166 |
| 6,995,865 B1 * | 2/2006 | Motomura | 358/1.9 |
| 7,016,530 B2 * | 3/2006 | Saito et al. | 382/162 |
| 7,068,839 B2 * | 6/2006 | Kim et al. | 382/162 |
| 2002/0033957 A1 * | 3/2002 | Takahata et al. | 358/1.9 |
| 2003/0099394 A1 * | 5/2003 | Shimazawa | 382/164 |

* cited by examiner

*Primary Examiner*—Jingge Wu
*Assistant Examiner*—Yeu-Tzer Chou
(74) *Attorney, Agent, or Firm*—Jianq Chyun IP Office

(57) ABSTRACT

A rapid color recognition method is provided. In the method, an area for representing a color of the pixel is identified according to the basic color component data of the pixel, and then the color code is outputted according to a predetermined color classification table of the area. In the method, since an isosceles right triangle plane is provided by extending and scaling the regular triangle plane by using one side of the regular triangle plane as a base, wherein the regular triangle plane is provided by normalizing the basic color component data. Therefore, the basic color component data is normalized without division operation, and thus the complexity of the operation of the color recognition is reduced.

12 Claims, 4 Drawing Sheets

RAPID COLOR RECOGNITION METHOD

CROSS REFERENCE TO RELATED APPLICATIONS

This application claims the priority benefit of Taiwan application serial no. 93109448, filed Apr. 6, 2004.

BACKGROUND OF INVENTION

1. Field of the Invention

The present invention generally relates to a color recognition method. More particularly, the present invention relates to a rapid color recognition method without division operation.

2. Description of Related Art

With the rapid development of electronic technology, a variety of electronic devices such as display device, printer, mobile phone or image sensor device may display colored images. Conventionally, when a digital image captured by, for example, an image sensor is processed, in general the image data of each pixel of the digital image is decomposed into basic color component data including such as red, blue and green color component data. For example, in the color recognition process, such as the color recognition of toy or color code of resistor, the corresponding color code is recognized and outputted according to the red, blue or green color component data of the basic color component data of each pixel.

In general, in the color recognition process, if the color code is recognized only according to the red, blue or green color component data of each pixel of the digital image, the brightness of each pixel of the digital image will cause erroneous recognition. Therefore, generally the red, blue and green color component data of each pixel of the digital image are generated by normalization operation, and then the color code is recognized according to the normalized image data. Therefore, the brightness of the image data is considered and the error of the color recognition is avoided. Assuming that the normalized red, blue and green color component data of the original red, blue and green color component data R, G and B are represented by r, g and b respectively, a conventional equation of color normalization may be expressed as follows:

$$r = R^k / (R^k + G^k + B^k)$$

$$g = G^k / (R^k + G^k + B^k)$$

$$b = B^2 / (R^k + G^k + B^k)$$

It is noted that k is the order of the normalization operation, in general the higher the order, the more complicated the normalization operation is. Therefore, generally the k value is preseted as 1 to reduce the complexity of the operation, i.e., only the first order normalized red, blue and green color component data is calculated. However, since the normalization operation includes a division operation, and the pixel number of the frame of the digital image is increased as the development of the electronic technology, the complexity of the normalization operation is increased. Therefore, the conventional normalization operation will be more difficult.

SUMMARY OF INVENTION

Therefore, the present invention is directed to a rapid color recognition method without division operation to normalize the image data of the color recognition. Thus the complexity of the operation of the color recognition is reduced.

The present invention provides a rapid color recognition method to recognize and output a color code according to a basic color component data of a pixel. It is noted that, in order to normalize the image data for the color recognition without division operation, the following steps are performed beforehand. First, a regular triangle plane is provided by normalizing the basic color component data. Then, an isosceles right triangle plane is provided by extending and scaling the regular triangle plane by using one side of the regular triangle plane as a base. Then, the isosceles right triangle plane is divided into a plurality of areas along two sides except the base by using i lines having slope 1 and j lines having slope −1. Therefore, an area for representing a color of the pixel is identified according to the basic color component data of the pixel, and then the color code is outputted according to a predetermined color classification table of the area.

In one embodiment of the invention, when the normalized basic color component data of the pixel is represented by (c1, c2, c3), and a magnification is represented by s, the data of the pixel is transformed into $((c1-c2+1)*s, c3*s)$ to extend and scale the regular triangle plane into the isosceles right triangle plane.

In one embodiment of the invention, when the basic color component data of the pixel is represented by C1, C2 and C3 respectively, the identification of the area for representing the color of the pixel is according to equations below:

$$C1 * I_m > (C1 + C2 + C3) > C1 * I_{m+1}$$

$$C2 * J_n > (C1 + C2 + C3) > C2 * J_{n+1}$$

It is noted that $I_m$, $I_{m+1}$, $J_n$ and $J_{n+1}$ represent coefficients corresponding to a position of the division of the isosceles right triangle by using the i lines having slope 1 and the j lines having slope −1, wherein m and n are integers and $0 \leq m \leq i$, $0 \leq n \leq j$.

In one embodiment of the invention, the rapid color recognition method further comprises, for example but not limited to, the following steps. First, whether the pixel is chromatic or achromatic is identified according to the basic color component data of the pixel. Thereafter, when the pixel is chromatic, the area for representing the color of the pixel is identified according to the basic color component data of the pixel, and the code of the color is outputted according to the predetermined color classification table of the area.

In one embodiment of the invention, when the basic color component data of the pixel is represented by C1, C2 and C3 respectively, the identification of whether the pixel is chromatic or achromatic is according to equations below:

$$Th1\_I \leq C3-C2 \leq Th1\_r,\ Th1\_t \leq C1-C2 \leq Th1\_b$$
$$\text{and } 0 \leq (C1+C2+C3) < Th1 \quad (1);$$

$$Th2\_I \leq C3-C2 \leq Th2\_r,\ Th2\_t \leq C1-C2 \leq Th2\_b$$
$$\text{and } Th1 \leq (C1+C2+C3) < Th2 \quad (2);$$

$$Th3\_I \leq C3-C2 \leq Th3\_r,\ Th3\_t \leq C1-C2 \leq Th3\_b$$
$$\text{and } Th2 \leq (C1+C2+C3) \quad (3);$$

It is noted that Th1_I, Th1_r, Th1_t, Th1_b, Th2_I, Th2_t, Th2_b, Th3_I, Th3_r, Th3_t, Th3_b, Th1 and Th2 represents predetermined parameters and Th2>Th1>0. When any one of equation (1), (2) or (3) is satisfied, the pixel is identified to be achromatic.

Alternatively, when the pixel is identified to be achromatic, the rapid color recognition method further comprises, for example but not limited to, the following steps. First, whether the color of the pixel is black color, white color or gray-scale color is identified according to the brightness of the pixel. Thereafter, a color code of the black color, the white color or the gray-scale color is outputted. In one embodiment of the invention, the identification of whether the color of the pixel is black color, white color or gray-scale color according to the brightness of the pixel is calculated by the following equations:

when $(C1+C2+C3) \leq$ Th_black, the color of the pixel is identified to be black color; and when $(C1+C2+C3) \geq$ Th_white, the color of the pixel is identified to be white color;

It is noted that the Th_black and the Th_white are predetermined parameters of the brightness.

Accordingly, in the color recognition process of the present invention, since the color code is obtained according to the normalized basic color component data, the division operation is not required. Therefore, the complexity of the operation of normalizing the image data of the color recognition is reduced.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
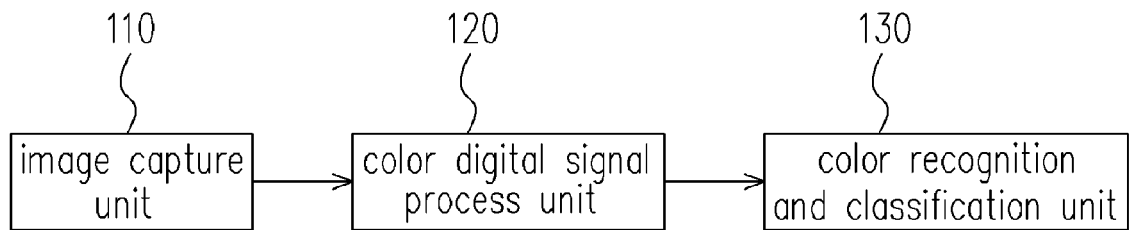
FIG. 1 illustrates an image data processing system.

FIG. 1 illustrates an image data processing system. Referring to FIG. 1, the image capture unit 110 is provided for capturing an image and outputting an image data with a plurality of bits. Then the image data is processed by the color digital signal process unit 120. The processing of the image data comprises, for example but not limited to, white balance calibration or color calibration and then outputting, for example three basic color component data such as red (R), green (G), and blue (B) color component data. Then, color recognition and classification unit 130 recognize the color of each pixel of the image data according to the three basic color component data R, G and B to output the color code for representing the color of the pixel.

Figure 2:
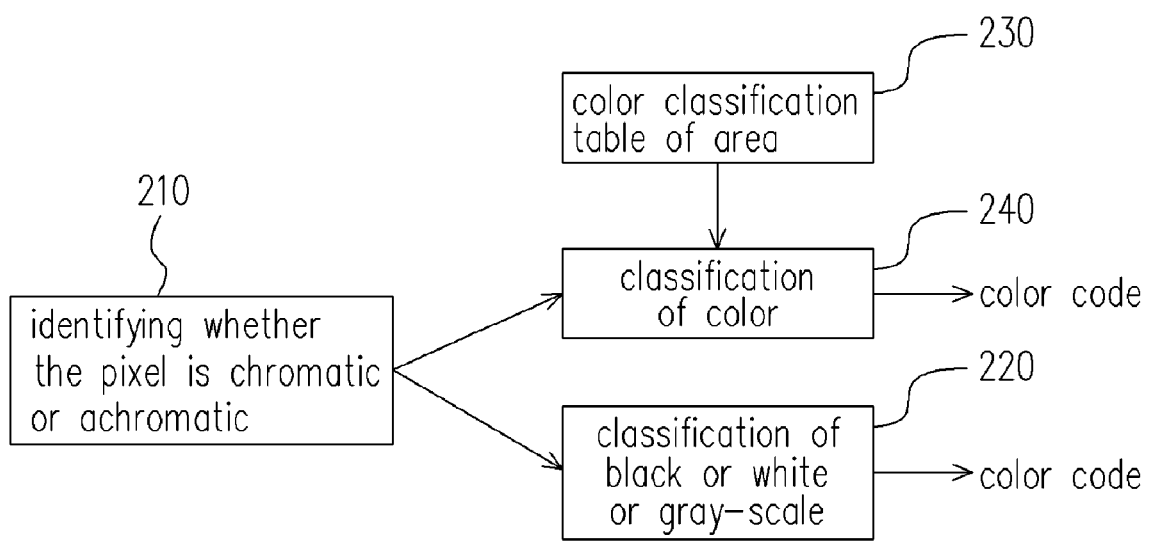
FIG. 2 illustrates a rapid color recognition system according to one embodiment of the present invention.

FIG. 2 illustrates a rapid color recognition system according to one embodiment of the present invention. Referring to FIG. 2, first of all, in block 210, the pixel is identified to be chromatic or achromatic according to the three basic color component data R, G, B of the pixel received. The identification of the pixel as being chromatic or achromatic is identified by the equations below:

$$Th1\_l \leq B-G \leq Th1\_r,\ Th1\_t \leq R-G \leq Th1\_b \text{ and}$$
$$0 \leq (R+G+B) < Th1 \quad (4)$$

$$Th2\_l \leq B-G \leq Th2\_r,\ Th2\_t \leq R-G \leq Th2\_b \text{ and}$$
$$Th1 \leq (R+G+B) < Th2 \quad (5)$$

$$Th3\_l \leq B-G \leq Th3\_r,\ Th3\_t \leq R-G \leq Th3\_b \text{ and}$$
$$Th2 \leq (R+G+B) \quad (6)$$

It is noted that Th1_l, Th1_r, Th1_t, Th1_b, Th2_l, Th2_r, Th2_t, Th2_b, Th3_l, Th3_r, Th3_t, Th3_b, Th1 and Th2 are predetermined parameters and Th2>Th1>0. When any one of the equation (4), (5) or (6) is satisfied, it means that the three basic color component data R, G and B are close. Therefore, the color of the pixel is identified to be achromatic.

In block 210, when the color of the pixel is identified to be achromatic, the process of block 220 is performed, wherein the color of the pixel is identified to be black color, white color or gray-scale color according to the brightness of the pixel. Therefore, the color code of the black color, white color or gray-scale color can be outputted. The equation for identifying the pixel as being black color, white color or gray-scale color is:

when $(R+G+B) \leq$ Th_black, the color of the pixel is identified as black color; and when $(R+G+B) \geq$ Th_white, the color of the pixel is identified as white color.

It is noted that Th_black and Th_white are predetermined parameters of brightness.

In addition, in block 210, when the color of the pixel is identified to be chromatic, the process of block 240 is performed, wherein the color code is recognized and outputted according to a color classification table of the area defined in block 230. It is noted that, in order to quantify the image data for the color recognition without division operation, the following steps are performed beforehand. First, a regular triangle plane is provided by normalizing the basic color component data. Then, an isosceles right triangle plane is provided by extending and scaling the regular triangle plane by using one side of the regular triangle plane as a base. Then, the isosceles right triangle plane is divided into a plurality of areas along two sides except the base by using i lines having slope 1 and j lines having slope −1. Hereinafter, the three steps will be described in detail referring to FIG. 3, FIG. 4, FIG. 5 and FIG. 6.

Figure 3:
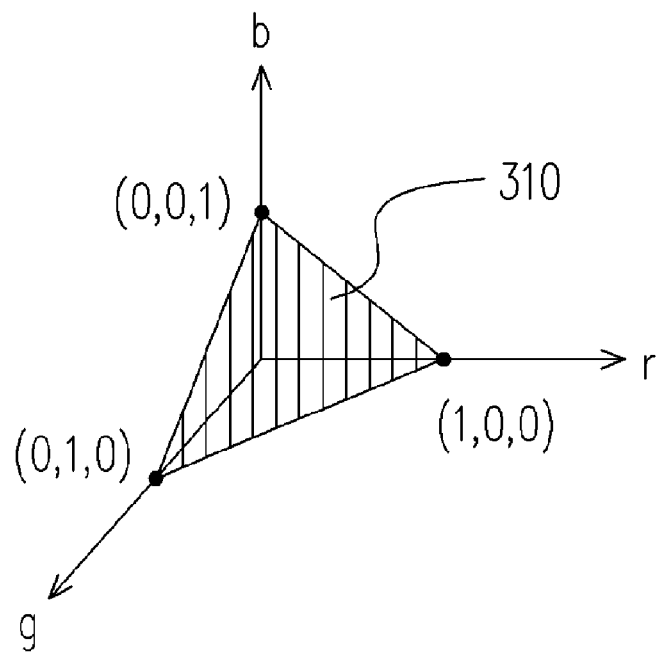
FIG. 3 illustrates a coordinate of normalized color component data r, g and b.

FIG. 3 illustrates a coordinate of normalized color component data r, g and b. Referring to FIG. 3, the axis r, g and b represents the normalized basic color component data of the red, blue and green color component data R, G and B respectively. In one embodiment of the invention, the regular triangle plane 310 is obtained by using the following equation to normalize the basic color component data R, G and B:

$$r=R/(R+G+B)$$

$$g=G/(R+G+B)$$

$$b=B/(R+G+B)$$

It is noted that, since r+g+b=1, the normalized color component data r, g and b are all located on the plane r+g+b=1, i.e., the regular triangle plane 310.

Figure 4:
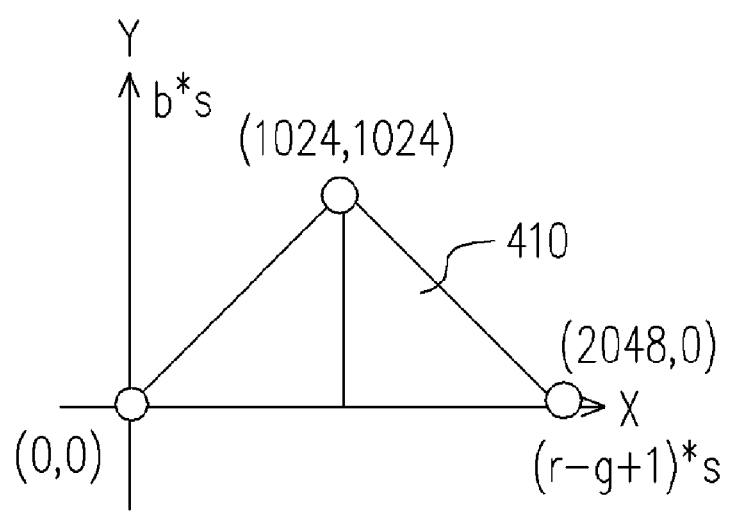
FIG. 4 illustrates an isosceles right triangle plan obtained by extending and scaling the regular triangle plane of FIG. 3.

Furthermore, any point of the regular triangle plane 310 can be transformed and represented into coordinate (X,Y) located in a plane by using any side of the regular triangle plane 310 as a base. In one embodiment of the invention, in order to simplify the equation of the classification of the color of the color recognition, the magnification s is provided to scale the coordinate data in the coordinate transformation. Far example, if the magnification s is 1024, the data of the pixel can be transformed into, for example but not limited to, ((r−g+1)*1024,b*1024). Therefore, the regular triangle plane 310 obtained front normalization of the basic color component data is extended and scaled into an isosceles right triangle plane 410 shown in FIG. 4. FIG. 4 illustrates an isosceles right triangle plan obtained by extending and scaling the regular triangle plane of FIG. 3.

Figure 5:
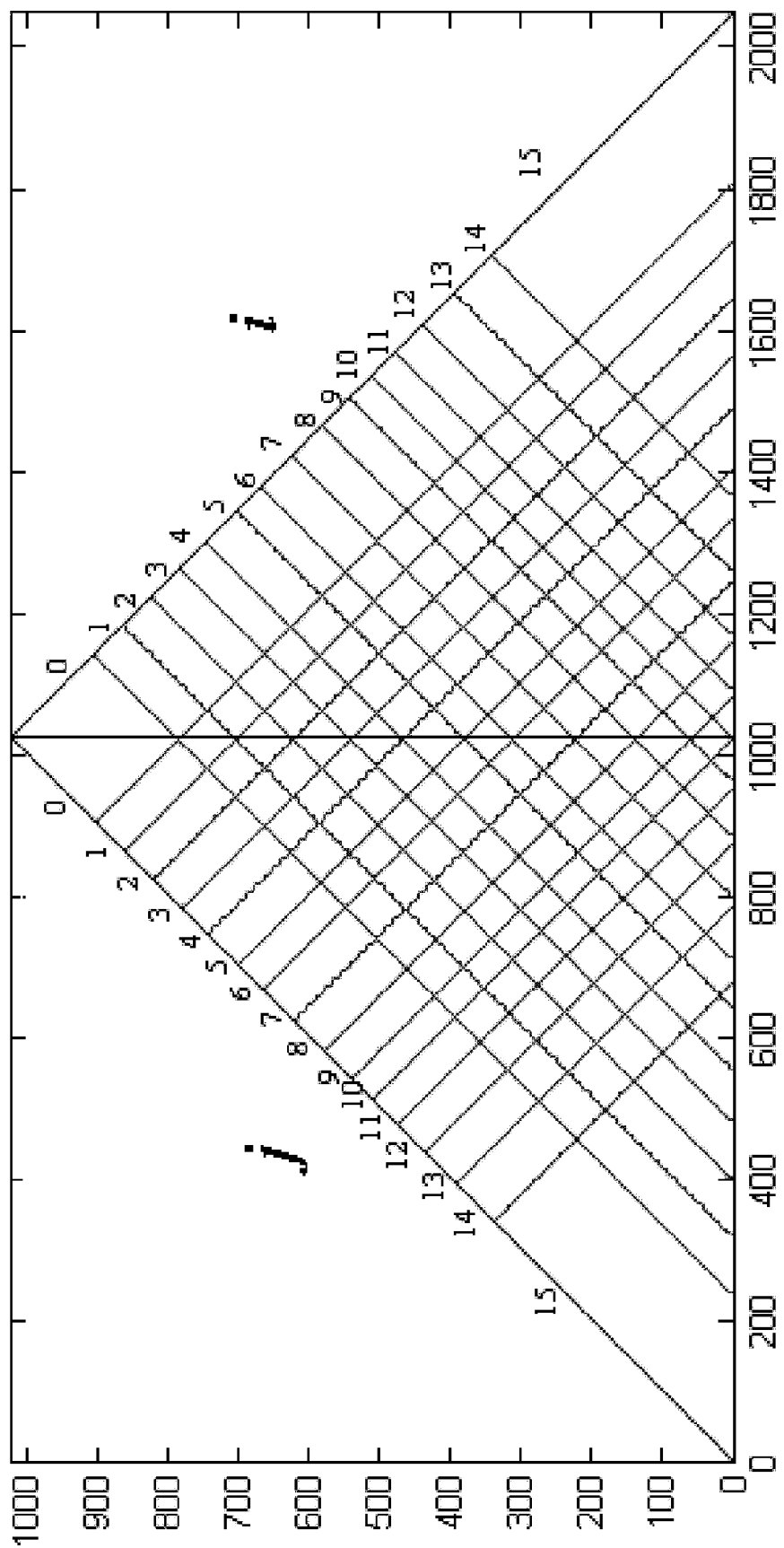
FIG. 5 illustrates an isosceles right triangle plane divided by 15 lines having slope 1 and 15 lines having slope −1.

Thereafter, the isosceles right triangle plane 410 is divided into a plurality of areas along two sides having slopes 1 and 1 of the isosceles right triangle plane 410 by using i lines having slope 1 and j lines having slope 1. FIG. 5 illustrates an isosceles right triangle plane divided by 15 lines having slope 1 and 15 lines having slope −1. Referring to FIG. 5, 15 lines having slope 1 and 15 lines having slope −1 are used to divide the isosceles right triangle plane, wherein the interval of two adjacent lines is adjusted according to the requirement of classification of color and can be equidistant or non-equidistant. As shown in FIG. 5, the isosceles right triangle plane 410 is divided into 211 areas, wherein different area represents same or different color.

Figure 6:
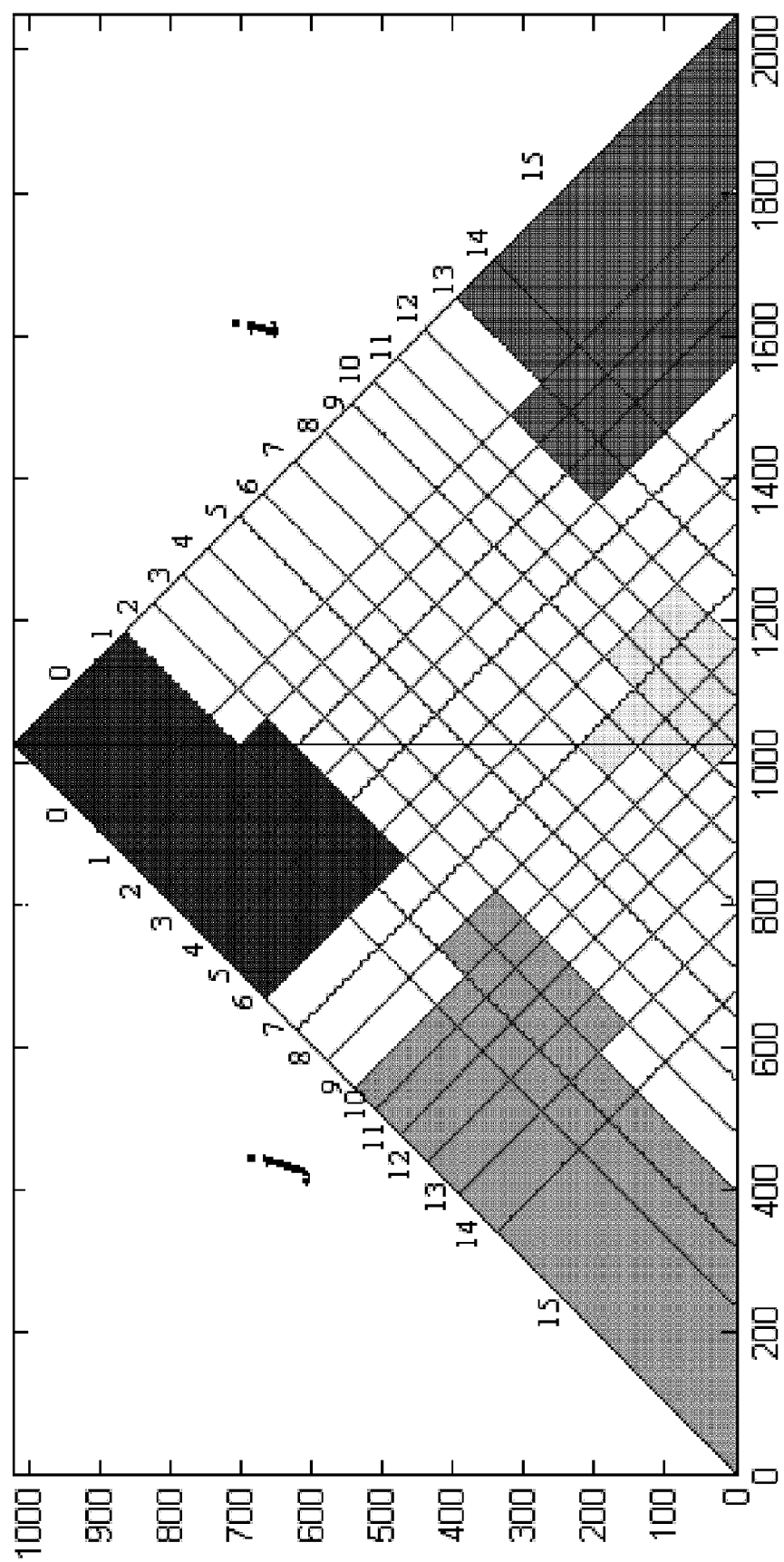
FIG. 6 illustrates a predetermined color classification table of the area.

After the isosceles right triangle plane is divided, a color classification table must be set according to the requirement of color classification, wherein the color classification table is used for identifying the color code of the area divided in FIG. 5. Therefore, the color code corresponding to any one of the divided area can be calculated according to the basic color component data R, G and B of the pixel, and output the color code. In another embodiment of the invention, a plurality of areas may be classified to represent the same color to output the same color code according to the requirement of the color classification. For example, FIG. 6 illustrates a predetermined color classification table of the area.

In one embodiment of the invention, the equations for identifying the area of the color of the pixel as shown in FIG. 5 is below:

$$R*I_m > (R+G+B) > R*I_{m+1}$$

$$G*J_n > (R+G+B) > G*J_{n+1}$$

It is noted that $I_m$, $I_{m+1}$, $J_n$ and $J_{n+1}$ represent coefficients corresponding to a position of the division of the isosceles right triangle by using the i lines having slope 1 and the j lines having slope −1, wherein m and n are integers and $0 \leq m \leq i$, $0 \leq n \leq j$. Hereinafter, the areas for representing the color of the pixel will be described in detail by an exemplary embodiment. For example, $R*I_0 > (R+G+B) > R*I_1$ represents the area of i=0;
$R*I_1 > (R+G+B) > R*I_2$ represents the area of i=1;
. . .
$R*I_{14} > (R+G+B) > R*I_{15}$ represents the area of i=14;
$R*I_{15} > (R+G+B) > R*I_{16}$ represents the area of i=15;
and $G*J_0 > (R+G+B) > G*J_1$ represents the area of j=0;
$G*J_1 > (R+G+B) > G*J$ represents the area of j=1;
. . .
$G*J_{14} > (R+G+B) > G*J_{15}$ represents the area of j=14;
$G*J_{15} > (R+G+B) > G*J_{16}$ represents the area of j=15;

Therefore, for example, when the equation $R*I_0 > (R+G+B) > R*I_1$ and the equation $G*J_0 > (R+G+B) > G*J_1$ are satisfied at the same time, the color of the pixel corresponds to the area of the intersection of i=0 and j=0. Thus, the color code corresponding to the area of the color of the pixel is outputted according to color classification table.

Accordingly, in the color recognition process of the present invention, since the color code is obtained according to the normalized basic color component data, the division operation is not required. Therefore, the complexity of the operation of the image data of the color recognition is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A method of rapid color recognition according to a basic color component data of a pixel to recognize and output a color code, the method comprising:
   providing a regular triangle plane by normalizing basic color component data;
   providing an isosceles right triangle plane by extending and scaling the regular triangle plane by using one side of the regular triangle plane as a base;
   dividing the isosceles right triangle plane into a plurality of areas along two sides except the base by using i lines having slope 1 and j lines having slope −1; and
   identifying an area for representing a color of the pixel according to the basic color component data of the pixel, and outputting the color code according to a predetermined color classification table of the area.

2. The method of claim 1, when the normalized basic color component data of the pixel is represented by (c1, c2, c3), and a magnification is represented by s, a data of the pixel is transformed into ((c1−c2+1)*s, c3*s) to extend and scale the regular triangle plane into the isosceles right triangle plane.

3. The method of claim 1, wherein when the basic color component data of the pixel is represented by C1, C2 and C3 respectively, the identification of the area for representing the color of the pixel is according to equations below:

$$C1*I_m > (C1+C2+C3) > C1*I_{m+1}$$

$$C2*J_n > (C1+C2+C3) > C2*J_{n+1}$$

wherein $I_m$, $I_{m+1}$, $J_n$ and $J_{n+1}$ represent coefficients corresponding to a position of the division of the isosceles right triangle by using the i lines having slope 1 and the j lines having slope −1, wherein m and n are integers and 0<m<i, 0<n<j.

4. The method of claim 1, further comprising:
   identifying whether the pixel is chromatic or achromatic according to the basic color component data of the pixel; and
   identifying an area for representing the color of the pixel according to the basic color component data of the pixel, and outputting the color code according to the predetermined color classification table of the area when the pixel is chromatic.

5. The method of claim 4, wherein when the basic color component data of the pixel is represented by C1, C2, and C3 respectively, whether the pixel is chromatic or achromatic is identified according to equations below:

$$Th1\_l \leq C3-C2 \leq Th1\_r,\ Th1\_t \leq C1-C2 \leq Th1\_b$$
$$\text{and } 0 \leq (C1+C2+C3) < Th1 \quad (1);$$

$$Th2\_l \leq C3-C2 \leq Th2\_r,\ Th2\_t \leq C1-C2 \leq Th2\_b$$
$$\text{and } Th1 \leq (C1+C2+C3) < Th2 \quad (2);$$

$$Th3\_l \leq C3-C2 \leq Th3\_r,\ Th3\_t \leq C1-C2 \leq Th3\_b$$
$$\text{and } Th2 \leq (C1+C2+C3) \quad (3);$$

wherein the Th1_I, the Th1_r, the Th1_t, the Th1_b, the Th2_I, the Th2_r, the Th2_t, the Th2_b, the Th3_I, the Th3_r, the Th3_t, the Th3_b, the Th1 and the Th2 represent predetermined parameters and Th2>Th1>0, when any one of equation (1), (2) or (3) is satisfied, the pixel is identified to be achromatic.

6. The method of claim 4, wherein when the pixel is identified to be achromatic, further comprises:
identifying whether the color of the pixel is black color, white color, or gray-scale color according to a brightness of the pixel; and
outputting a color code of the black color, the white color or the gray-scale color.

7. The method of claim 6, wherein when the basic color component data of the pixel is represented by C1, C2 and C3 respectively, whether the color of the pixel is black color, white color or gray-scale color is identified according to the brightness of the pixel according to equations below:

when $(C1+C2+C3) \leq Th\_black$, the color of the pixel is identified to be black color; and when $(C1+C2+C3) \geq Th\_white$, the color of the pixel is identified to be white color;

wherein the Th_black and the Th_white are predetermined parameters of the brightness.

8. A method of rapid color recognition according to a basic color component data of a pixel to recognize and output a color code when the basic color component data of the pixel is represented by C1, C2 and C3 respectively, the method comprising:
identifying an area for representing a color of the pixel according to equations below:

$C1*I_m > (C1+C2+C3) > C1*I_{m+1}$ $C2*J_n > (C1+C2+C3) > C2*J_{n+1}$ wherein $I_m$, $I_{m+1}$, $J_n$ and $J_{n+1}$ represent different coefficients respectively; and
outputting a color code according to a predetermined color classification table of the area.

9. The method of claim 8, further comprising:
identifying whether the pixel is chromatic or achromatic according to the basic color component data of the pixel; and
identifying the area for representing the color of the pixel according to the basic color component data of the pixel, and outputting the color code according to the predetermined color classification table of the area when the pixel is chromatic.

10. The method of claim 9, wherein whether the pixel is chromatic or achromatic is identified according to equations below:

$Th1\_I \leq C3-C2 \leq Th1\_r$, $Th1\_t \leq C1-C2 \leq Th1\_b$
and $0 \leq (C1+C2+C3) < Th1$ \hfill (1);

$Th2\_I \leq C3-C2 \leq Th2\_r$, $Th2\_t \leq C1-C2 \leq Th2\_b$
and $Th1 \leq (C1+C2+C3) < Th2$ \hfill (2);

$Th3\_I \leq C3-C2 \leq Th3\_r$, $Th3\_t \leq C1-C2 \leq Th3\_b$
and $Th2 \leq (C1+C2+C3)$ \hfill (3);

wherein the Th1_I, the Th1_r, the Th1_t, the Th1_b, the Th2_I, the Th2_r, the Th2_t, the Th2_b, the Th3_I, the Th3_r, the Th3_t, the Th3_b, the Th1 and the Th2 represent predetermined parameters and Th2>Th1>0, when any one of equation (1), (2) or (3) is satisfied, the pixel is identified to be achromatic.

11. The method of claim 9, wherein when the pixel is identified to be achromatic, further comprises:
identifying whether the color of the pixel is black color, white color or gray-scale color according to a brightness of the pixel; and
outputting a color code of the black color, the white color or the gray-scale color.

12. The method of claim 11, wherein when the basic color component data of the pixel is represented by C1, C2 and C3 respectively, whether the color of the pixel is black color, white color or gray-scale color according to the brightness of the pixel is identified according to equations below:

when $(C1+C2+C3) \leq Th\_black$, the color of the pixel is identified to be black color; and when $(C1+C2+C3) \geq Th\_white$, the color of the pixel is identified to be white color;

wherein the Th_black and die Th_white are predetermined parameters of the brightness.

* * * * *